Figure 1:
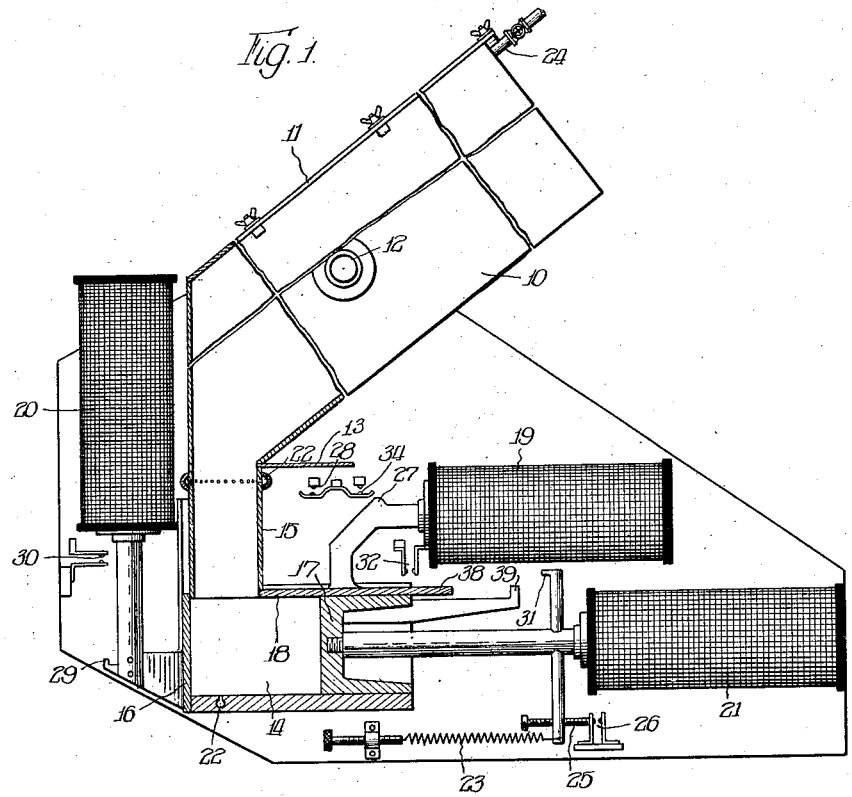

June 10, 1930.  S. CHASE, 4TH  1,762,159
METHOD AND APPARATUS FOR FORMING LOAVES
Filed April 21, 1927

Witness:
G. Burkhardt.

Inventor:
Stephen Chase IV.
By [signature]
attys.

Patented June 10, 1930

1,762,159

UNITED STATES PATENT OFFICE

STEPHEN CHASE, 4th, OF CHICAGO, ILLINOIS

METHOD AND APPARATUS FOR FORMING LOAVES

Application filed April 21, 1927. Serial No. 185,641.

This invention relates to method and apparatus for forming loaves from dough in bread manufacturing. It has to do more particularly with quantity production, as in commercial bakeries, as distinguished from domestic production.

The general purpose of the invention is the provision of method and apparatus whereby loaves may be formed from a batch of dough in a simple, rapid and direct fashion with a minimum amount of handling and a minimum number of operations.

A more particular object is the provision of method and apparatus whereby loaves may be formed in proper condition for baking without requiring several of the forming, rounding and proofing operations now employed in quantity production.

Another object is the provision of a method and apparatus whereby accurate measurement of the dough for the respective loaves may be accomplished automatically and with certainty.

Still another object is the provision of method and apparatus whereby the weight of the loaves may be accurately controlled by dividing the dough in accordance with volume measurement.

Another object is the provision of method and apparatus which will improve the quality of the bread in uniformity and homogeneity of texture.

Other and further objects will be pointed out or indicated hereinafter, or will be apparent to one skilled in the art upon an understanding of the invention or its employment in practice.

In the drawing forming a part of this specification, I illustrate in diagrammatic fashion one arrangement of apparatus wherein the invention may be embodied and practiced, but it is to be understood that this is presented for purpose of illustration only and is not to be accorded any interpretation having the effect of limiting the claims short of the true and most comprehensive scope of the invention in the art.

Figure 2:
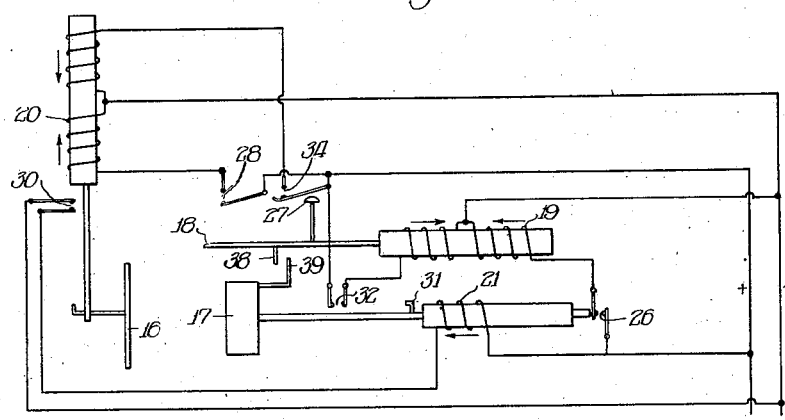

In said drawing,

Fig. 1 is an illustration in the nature of a part side elevational and part sectional elevational view of apparatus embodying the invention, same having portions broken away to show some of the parts in reduced size relative to the others; and Fig. 2 is a diagram of operating parts and their switching connections.

Bread making, as carried on at a commercial scale in bakeries, involves the handling of large quantities of dough and its separation into portions suitable measured and prepared for baking as loaves. As now customarily practiced, the various operations of proofing, dividing, molding, rounding, etc., are carried on in a number of special machines adapted to perform respective operations on the dough to put the loaves into proper condition for baking. Other than the substantial investment required for such a number of machines, the number of manipulations and handlings of the dough by them consumes an undesirable length of time and has various undesirable effects on the dough which are likely to affect its lightness and uniformity of texture, requiring a considerable period of time for final proofing after the loaves are formed before they are in condition for baking. The present methods employed for production on a large scale are also somewhat uncertain as to accurate measurement of the dough into loaves of uniform weight. The present invention provides a method and apparatus whereby many of the operations and most of the machinery now employed are rendered unnecessary, and the dough is turned into loaves suitable for baking with a minimum amount of detrimental handling and in a considerably shortened period of time, as compared with the present methods.

Described generally, the method of the present invention involves the raising of a batch of dough, either under an atmospheric pressure or under a superatmospheric pressure calculated to hold the gas in the dough and produce a uniform distribution of it throughout the dough mass, the extrusion of dough from the mass into a measuring receptacle, under a superatmospheric pressure calculated to maintain a uniform density in the dough so that the weight of a measured quantity will be proportionate to its volume, the separation of the measured volume from the mass in a fashion such as to maintain an unbroken gas-confining skin on the separated portion, and the discharge of the measured and separated portion, which constitutes a loaf, into atmosphere in suitable condition for such final proofing as may be desired preliminary to baking. Incident to the extrusion and discharge of the separated portion, the loaf is suitably molded and the surface skin stretched and smoothed and, if desired, greased.

The nature of the method and of apparatus appropriate for carrying it out may be ascertained by reference to the mechanism illustrated in the drawing. In Fig. 1, the reference numeral 10 designates a trough of suitable size to receive a batch of dough. In the illustration the trough is considerably reduced in size by parts broken out, and thus appears disproportionate in size to the other portions of the mechanism illustrated. This trough is closed by a removable cover 11 which is adapted to be fixed thereon in a substantially air tight manner. The trough is mounted in a suitable frame so that it can swing through a vertical arc on an axis 12, whereby it may be swung to a position in which its bottom is horizontal, and from such position to an upright or inclined position as shown, wherein the bottom of the trough is on a rather steep slope. Mounted in the frame so as to swing with the trough is a measuring receptacle 14 which is connected with the discharge end of the trough by a spout portion 15 having a cross section materially reduced from that of the trough, which spout portion may be closed off from the trough by a slide 13. The width of the measuring receptacle 14 is that proper for a portion of dough to form a loaf of the desired length. The connection between the measuring receptacle 14 and the trough is substantially air tight. The discharge end of the measuring receptacle is closed by a sliding door or closure 16 which cooperates therewith in an air tight manner, and the opposite end of the measuring receptacle is closed by a plunger 17 which fits in a substantially air tight fashion and is movable from the discharge end to vary the capacity of the measuring receptacle, and movable toward the discharge end to eject dough from the measuring receptacle when the closure 16 is in opened position. The separating device 18 is arranged to operate along the top of the measuring receptacle and across the communicating end of the spout 15 to separate dough in the receptacle from that in the spout. The separating member is operated by suitable means, such as the solenoid 19 illustrated, to move the separating member across the end of the spout for the separating operation and to retract it. The closure 16 is operable by suitable means, such as the solenoid 20, whereby it may be slid upwardly from in front of the measuring receptacle to permit discharge of dough therefrom, and downwardly into the position as illustrated, to close the discharge end of the measuring receptacle. The measuring and ejecting plunger 17 is movable rearwardly in the measuring receptacle by pressure of dough fed into the latter in front of it, and is propelled forwardly in the measuring receptacle by suitable actuating means such as the solenoid 21. The solenoids 19, 20 and 21 are mounted on the frame so as to swing with the trough. The trough is provided with a connection 24 whereby air under pressure may be introduced to hold the dough in the trough under a superatmospheric pressure, and suitable grease feeding channels 22 may be provided, through which grease may be fed through the walls of the spout portion 15 and measuring receptacle 14, to lubricate the inner surfaces thereof, such feed being under a pressure superior to that under which the dough is maintained.

The operation of the apparatus may be followed by reference to the diagram illustrated in Fig. 2. The trough 10 being in the horizontal position, the cover is removed and a batch of properly mixed dough is deposited therein. This dough may be allowed to rise to the desired extent under atmospheric pressure, or any certain amount of air may be introduced through the connection 24 to hold the dough under a superatmospheric pressure while it rises. The application of this superatmospheric pressure during the rising of the dough has the tendency to prevent the gas accumulating in large bubbles in the dough, and cause it to distribute itself more equally through the dough mass, so that the texture of the mass will be more uniform. By this control, the necessity may be avoided for beating down the dough to break out the large gas bubbles. When the dough has risen sufficiently, the apparatus is swung so as to bring the trough to its inclined position, whereby the mass of dough is propelled by gravity toward the discharge end of the trough. If not previously applied, the air pressure is now applied through the connection 24, and increased progressively. The dough is thus extruded through the spout portion 15 into the chamber of the measuring receptacle by a uniform pressure applied through the entire mass of dough. Incident to this extrusion through the spout portion, the sides of the sliver are molded against the walls of the spout and the surface stretched and rubbed together to form an unbroken surface skin of the sort desired to retain the confined gas and make a smooth loaf surface. As the dough accumulates in the measuring chamber, it forces back the plunger 17 against the resistance of the spring 23, the tensioning power of which may be adjusted. When the plunger has thus been forced back to an extent sufficient to admit the desired quantity of dough to the measuring receptacle, a contact closing device 25 carried with the plunger closes the contacts 26, whereupon the solenoid 19 is energized to propel the separating device 18 forwardly and separate the body of dough in the measuring receptacle from that in the spout. As the separating member 18 reaches its extreme position, a contact operating member 27, operable with the separating member, closes contacts 28 and solenoid 20 is energized to remove closure 16 from in front of the measuring chamber. As this closure reaches its open position, a contact closing device 29 closes contacts 30 and solenoid 21 is energized to propel ejecting plunger 17 forwardly and expel the separated portion of dough from the measuring chamber into a pan presented at the discharge end of the measuring receptacle. As plunger 17 reaches its limit position, a contact closing device 31 operable with it closes contacts 32, causing the solenoid 19 to be energized to retract the separating member 18. The plunger 17, however, remains in a position closing the throat 15 until after contact closing member 27, in the reverse movement of the separating member, closes contacts 34, whereby solenoid 20 is energized to restore the closure 16 to a position closing the discharge end of the measuring receptacle. Thereupon, a plunger retracting element 38 carried with the severing member picks up a cooperating element 39 connected with the plunger and moves the latter back until its forward face is just clear of the communicating opening between the spout 15 and the measuring receptacle. The measuring chamber and throat 15 now again being in communication, a further portion of the dough mass is extruded into the former from the throat 15 and forces back the plunger 17 to the point where the cycle is again started by the closing of contacts 26.

It will be observed, accordingly, that the extrusion, surface molding, measuring and separating of the dough, are carried on under a continuous superatmospheric pressure which is transmitted through the entire mass of the dough, said pressure being kept constant by increasing the air pressure as the amount of dough in the trough becomes lessened, so that the pressure on the dough in the measuring chamber is kept uniform even though the portion of said pressure resulting from the weight of the dough in the trough varies incident to the reduction in quantity of that mass. As a result of this uniformity of pressure under which the dough is fed and held in the measuring chamber, its density will be kept uniform and its division into portions of equal volume will keep those divisions uniform in weight. Thus all of the loaves, formed in the manner above described, will be uniform in size, weight and density. As mentioned above, it is preferable that the separate member 18 be of such nature as will separate the dough by a pinching action rather than by a cutting action, and for this purpose its active edge may be blunt. By separation in this fashion, the surface skin is pinched together across the portion where the separation takes place, so that the integrity of the surface skin is maintained and the gas retained within the dough. The extent of movement of the severing member 18 need be comparatively short, as the dough is separated across the loaf rather than longitudinally. Incident to the extrusion of the dough through the throat 15 and its ejection from the measuring chamber, its surfaces are greased by movement in contact with the greased walls of those members. The use of the present invention in the dividing of dough avoids, to a great extent, the "killing" and mutilation of the dough, as it is not subjected to heavy mechanical pressures or repeated handling. Consequently, when discharged from the measuring chamber, it is in such condition that very little additional time for proofing, to place it in condition for baking, is necessary. Moreover, since there is no necessity for further handling of the divided loaves, it is not necessary to dust them with flour, or otherwise treat the greased surface which they have when discharged from the measuring chamber.

What I claim is:

1. A method of forming loaves which comprises confining a mass of dough, applying yielding pressure to the mass to extrude a portion thereof, applying yielding pressure to the extruded portion in opposition to the extruding pressure, measuring the extruded portion and pinching the surface skin together between the mass and the measured portion to separate the latter from the former.

2. Apparatus for forming loaves comprising, in combination, a container for a mass of dough, means for applying elastic fluid pressure to the mass of dough in the container, a measuring receptacle in communication with said container through an extrusion throat, said measuring receptacle having a portion movable against a yielding pressure to vary the capacity thereof, a separating member operable to separate the dough in the measuring receptacle from that in the container and means for opening the measuring receptacle to permit discharge of dough therefrom.

3. An apparatus for forming loaves comprising, in combination, a container for a mass of dough, means for maintaining an elastic fluid pressure on dough in the container, a measuring receptacle communicating with the container through an extrusion throat, said measuring receptacle having a portion movable against a yielding resistance to vary the capacity thereof, means for opening and closing communication between the measuring receptacle and the container and means for opening the measuring receptacle to permit discharge of dough therefrom.

4. Apparatus for forming loaves comprising, in combination, a container for a mass of dough, a measuring receptacle in communication with said container, said measuring receptacle having a portion movable against a yielding resistance to vary the capacity thereof, a pinching device movable relative to said measuring receptacle for separating dough therein from that in the container, and means controlled by said movable portion of the measuring receptacle to actuate the pinching device.

5. Apparatus for forming loaves comprising, in combination, a container for a mass of dough, means for applying pressure to a mass of dough in the container to extrude a portion thereof, means for measuring the extruded portion, dividing means movable relative to the measuring receptacle for separating the extruded portion from the mass, and actuating means for the dividing means operably controlled by the measuring means.

6. Apparatus for forming loaves comprising, in combination, a container for a mass of dough, a measuring receptacle in communication with the container, a movable closure for said measuring receptacle, means for applying pressure to a mass of dough in the container to extrude a portion thereof into the measuring receptacle, opening means for the movable closure, dividing means for separating the dough in the measuring receptacle from the mass, and means controlled by the dividing means for effecting operation of said opening means.

7. Apparatus for forming loaves comprising, in combination, a tiltably mounted container for holding a mass of dough, said container having an outlet toward which dough in the container is fed by gravity in one position of the container, a measuring receptacle communicating with said outlet, dividing means for opening and closing communication between the measuring receptacle and the container, and means for opening the measuring receptacle to permit discharge of dough therefrom.

8. Apparatus for forming loaves comprising, in combination, a container for a mass of dough, a measuring receptacle having communication therewith through an extrusion throat, a plunger movable in the measuring receptacle by pressure of dough extruded from the container, dividing means operable independently of the measuring receptacle for separating dough in the measuring receptacle from that in the container, and means operable by said plunger for effecting actuation of the dividing means.

9. Apparatus for forming loaves comprising, in combination, a container for a mass of dough, a measuring receptacle having communication therewith, means for applying pressure to a mass of dough in the container to extrude a portion thereof into the measuring receptacle, a closure for the measuring receptacle, means for separating dough in the measuring receptacle from the mass in the container, a plunger movable in the measuring receptacle and movable against yielding pressure by the pressure of dough extruded from the container, means for moving the closure, and means for actuating said plunger to discharge dough from the measuring receptacle.

10. In apparatus for dividing dough, in combination, a container for a mass of dough, a measuring receptacle having communication with said container, a movable element operable in said receptacle by dough deposited therein from the container, a separating device for dividing dough in the measuring receptacle from that in the container, and means under control of said movable element for actuating the separating device.

11. Apparatus for dividing dough comprising, in combination, a container for a mass of dough, a measuring receptacle communicating therewith, a closure for said measuring receptacle, a movable element operable by dough discharged into the measuring receptacle from the container, a separating device for dividing dough in the measuring receptacle from that in the container, means under control of said movable element for actuating the separating device, and means under control of the separating device for actuating the closure.

12. Apparatus for dividing dough comprising, in combination, a container for a mass of dough, a measuring receptacle having communication with said container and having also a discharge opening, a separating device for dividing dough in said receptacle from that in the container, a closure device for opening and closing said discharge opening, a plunger operable to expel dough from the measuring receptacle through the discharge opening, means operable by the severing device to effect operation of the closure to open the receptacle, and means operable by the closure device to effect operation of the plunger to expel dough from the receptacle.

13. Apparatus for dividing dough comprising, in combination, a tiltably mounted container adapted to hold a mass of dough, said container having a restricted extrusion throat, a measuring receptacle communicating with said extrusion throat, means for separating dough in the receptacle from that in the extrusion throat, means for discharging dough from the receptacle, and means for maintaining elastic fluid pressure on a mass of dough in the container, said container formed to feed dough by gravity to the extrusion throat when in tilted position.

14. A method of forming loaves which comprises confining a mass of dough, applying continuously a yielding pressure to the mass extruding portions thereof successively against a yielding pressure, subjecting the surface of the extruded portions to a molding friction incident to the extrusion thereof, measuring the extruded portions successively incident to extrusion thereof, and pinching the surface skin together between the mass and the measured portions to separate the latter from the former.

15. A method of forming loaves comprising confining a mass of dough, applying pressure to the mass to extrude a portion thereof, subjecting the extruded portion to yielding pressure throughout the time of its extrusion, and pinching the surface skin together between the mass and the extruded portion to separate the latter from the former.

In testimony whereof I have hereunto subscribed my name.

STEPHEN CHASE, IV.